US010132159B2

(12) United States Patent
Burgos

(10) Patent No.: US 10,132,159 B2
(45) Date of Patent: Nov. 20, 2018

(54) PRODUCTION LOGGING MULTI-LATERAL WELLS

(71) Applicant: Schlumberger Technology Corporation, Sugar Land, TX (US)

(72) Inventor: Rex Pastrana Burgos, Richmond, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 297 days.

(21) Appl. No.: 14/892,361

(22) PCT Filed: May 23, 2014

(86) PCT No.: PCT/US2014/039324
§ 371 (c)(1),
(2) Date: Nov. 19, 2015

(87) PCT Pub. No.: WO2014/190252
PCT Pub. Date: Nov. 27, 2014

(65) Prior Publication Data
US 2016/0186554 A1    Jun. 30, 2016

Related U.S. Application Data

(60) Provisional application No. 61/827,207, filed on May 24, 2013.

(51) Int. Cl.
*E21B 47/06* (2012.01)
*E21B 47/10* (2012.01)
(Continued)

(52) U.S. Cl.
CPC ...... *E21B 47/1005* (2013.01); *E21B 41/0035* (2013.01); *E21B 47/06* (2013.01);
(Continued)

(58) Field of Classification Search
CPC .... E21B 47/0035; E21B 47/06; E21B 47/065; E21B 47/10; E21B 47/1005; E21B 47/102; E21B 47/123; G01V 9/005
See application file for complete search history.

(56) References Cited

U.S. PATENT DOCUMENTS

| | | | |
|---|---|---|---|
| 5,944,108 A | 8/1999 | Baugh et al. | |
| 6,349,768 B1 * | 2/2002 | Leising | E21B 23/03 166/117.5 |

(Continued)

FOREIGN PATENT DOCUMENTS

| | | |
|---|---|---|
| RU | 59714 U1 | 12/2006 |
| RU | 2305184 C2 | 8/2007 |

(Continued)

OTHER PUBLICATIONS

International Search Report and the Written Opinion for International Application No. PCT/US2014/039324 dated Sep. 18, 2014.
(Continued)

*Primary Examiner* — Daniel P Stephenson
(74) *Attorney, Agent, or Firm* — Michael L. Flynn; Robin Nava

(57) ABSTRACT

Apparatus, systems, and methods operable to perform production logging of a lateral wellbore of a multi-lateral well. For example, a downhole tool is conveyed into a main wellbore of a multi-lateral well via coiled tubing. A component of the downhole tool is used to locate a lateral wellbore extending from the main wellbore, and then the downhole tool is conveyed into the lateral wellbore via the coiled tubing. Production logging data is then obtained with the downhole tool in the lateral wellbore.

17 Claims, 9 Drawing Sheets

(51) Int. Cl.
  *G01V 9/00*     (2006.01)
  *E21B 41/00*    (2006.01)
  *E21B 47/12*    (2012.01)
(52) U.S. Cl.
  CPC ............ *E21B 47/065* (2013.01); *E21B 47/10* (2013.01); *E21B 47/102* (2013.01); *E21B 47/123* (2013.01); *G01V 9/005* (2013.01)

(56) References Cited

U.S. PATENT DOCUMENTS

| | | | |
|---|---|---|---|
| 9,810,809 B2 * | 11/2017 | Farhadiroushan ... | G01V 11/005 |
| 2005/0263281 A1 * | 12/2005 | Lovell ................... | E21B 17/206 |
| | | | 166/255.1 |
| 2016/0186554 A1 * | 6/2016 | Burgos ................ | E21B 41/0035 |
| | | | 166/250.01 |

FOREIGN PATENT DOCUMENTS

| | | |
|---|---|---|
| RU | 2378511 C2 | 1/2010 |
| RU | 2394985 C1 | 7/2010 |
| WO | 2009023668 A1 | 2/2009 |
| WO | 2014190252 A1 | 11/2014 |

OTHER PUBLICATIONS

Menkhaus et al. "Fiber-Optic Technology Allows Real-Time Production Logging Well Campaign to Continue Where Traditional Logging Tools Fell Short," SPE 154064, prepared for presentation at the SPE/ICoTA Coiled Tubing & Well Intervention Conference & Exhibition held in The Woodlands, Texas, USA, Mar. 27-28, 2012, pp. 1-9.

* cited by examiner

PRODUCTION LOGGING MULTI-LATERAL WELLS

CROSS-REFERENCE TO RELATED APPLICATIONS

This application claims the benefit of U.S. Provisional Application No. 61/827,207, entitled "System and Method for Production Logging Multi-Lateral Wells Utilizing Coiled Tubing," filed May 24, 2013, the entirety of which is hereby incorporated herein by reference.

BACKGROUND OF THE DISCLOSURE

A multi-lateral well includes a main wellbore or "mother bore" and multiple lateral wellbores or "legs" extending away from the main wellbore. During well construction, the lateral wellbores are initiated by "kicking off" from the main wellbore at predetermined locations. The addition of the lateral wellbores increases contact with the reservoir, thus improving hydrocarbon production without additional wellheads and associated surface equipment. The lateral wellbores may be cased or uncased, depending on stability of the reservoir. Production from the lateral wellbores may be co-mingled or produced together with the production from the main wellbore without using downhole flow control devices, provided that the flowing pressures are compatible. In some cases, one or more of the lateral wellbores may be isolated from the main wellbore and produced through separate completion strings.

Due to the structural make-up of a multi-lateral well, an intervention that targets a specific lateral wellbore employs successful reentry into the particular leg at a junction with the main wellbore. As a result, a bottom-hole assembly (BHA) may be oriented so that it enters the correct lateral wellbore and proceeds to the intended location. Without proper orientation, the BHA will default to the natural tendency of the wellbore curvature, which more often than not is the main wellbore.

SUMMARY OF THE DISCLOSURE

The present disclosure introduces a method to perform production logging of a lateral wellbore of a multi-lateral well. In one embodiment, the method includes coupling a downhole tool to a downhole termination of coiled tubing, and conveying the downhole tool into a main wellbore of the multi-lateral well via the coiled tubing. The method also includes using a component of the downhole tool to locate a lateral wellbore from the main wellbore, and extending the downhole tool into the lateral wellbore via the coiled tubing. The method still further includes performing production logging with the downhole tool in the lateral wellbore.

The present disclosure also introduces a downhole tool coupled to a downhole termination of coiled tubing for conveyance into a main wellbore that extends from a wellsite surface to a subterranean formation. In an embodiment, the downhole tool includes a lateral wellbore reentry tool operable to locate a lateral wellbore from the main wellbore, the downhole tool operable to be extended into the lateral wellbore via the coiled tubing. The downhole tool also includes a depth control/sensing device operable to determine a depth location of the downhole tool in the lateral wellbore, and at least one sensor operable to perform production logging in the lateral wellbore referenced to the depth location. The downhole tool still further includes a sonde operable to transmit measurement data resulting from the production logging from the downhole tool over a communications link to the wellsite surface of the multi-lateral well.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
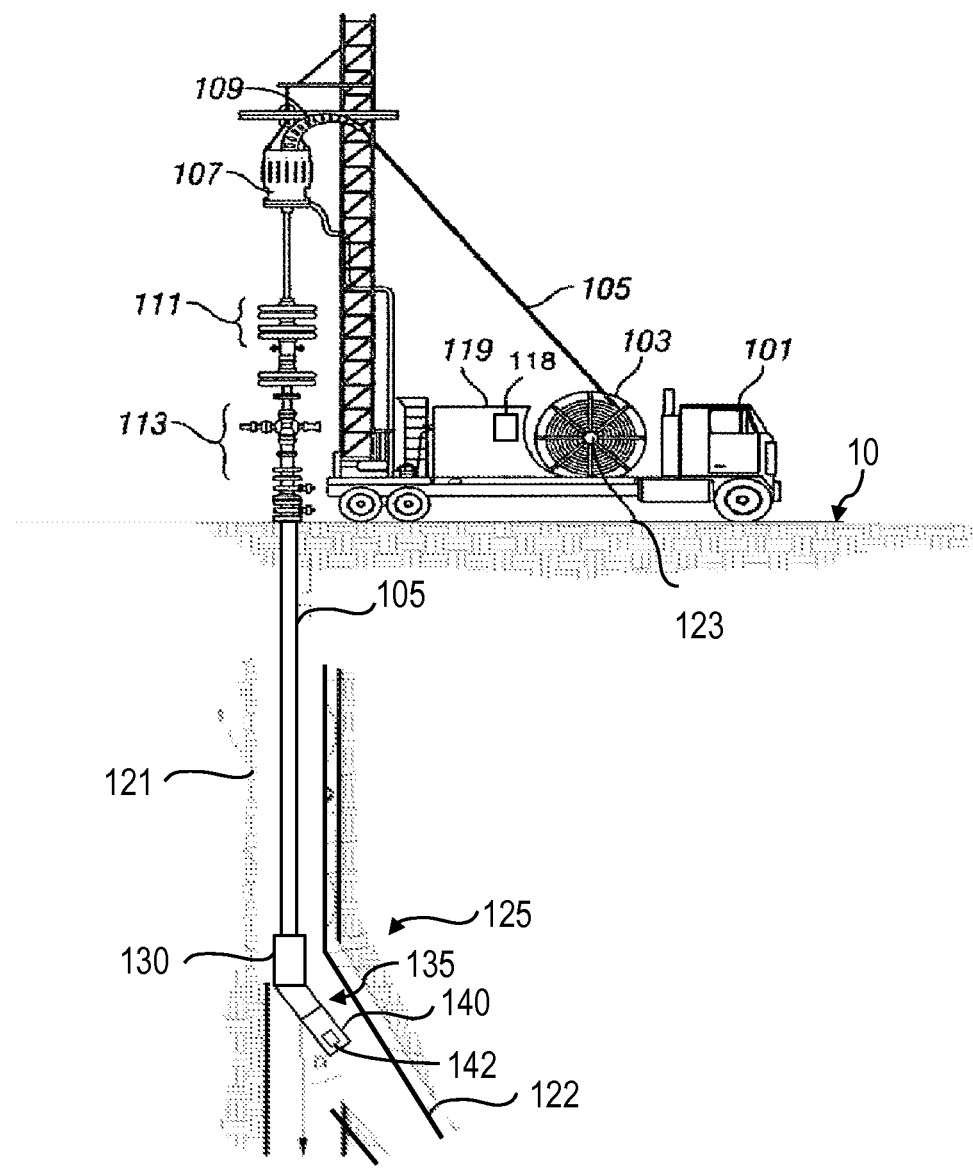
FIG. 1 is a schematic view of at least a portion of apparatus according to one or more aspects of the present disclosure.

It should be noted that, in the development of an actual implementation within the scope of the present disclosure, numerous implementation-specific decisions may be made to achieve a predetermined goal, such as compliance with system- and business-related constraints, which may vary from one implementation to another. However, a person having ordinary skill in the art will appreciate that such development may be complex and time consuming, but would nevertheless be a routine undertaking for those of ordinary skill in the art having the benefit of the present disclosure.

Example implementations within the scope of the present disclosure are described below with reference to the accompanying drawings. Numerous details are set forth below to provide a more thorough understanding of various aspects of the present disclosure. However, a person having ordinary skill in the art will appreciate that the example implementations disclosed herein may be practiced without some of these details. In other instances, well-known features may not be described in detail, such as may avoid complicating the following description.

Various terminology and phraseology are used herein for descriptive purposes, and thus may not be limiting in scope. Language such as "including," "comprising," "having," "containing," and "involving," and variations thereof, is intended to be broad and encompass the subject matter listed thereafter, equivalents, and additional subject matter not explicitly recited.

In addition, the present disclosure may repeat reference numerals and/or letters in the various example implementations. This repetition is for simplicity and clarity, and does not in itself dictate a relationship between the various implementations, embodiments, and/or configurations described below.

Implementations within the scope of the present disclosure may relate generally, but not by way of limitation, to apparatus and methods for production logging in a lateral wellbore extending from the main wellbore of a multi-lateral well. Production logging comprises the generation of a record (log) of one or more in-situ measurements that describe the nature and behavior of fluids in or around a wellbore during production. When utilized during injection operations, the logging may also be known as injection logging to those having ordinary skill in the art. Thus, reference herein to production logging is considered to include, be applicable to, or be readily adaptable to injection logging.

Production logging may be utilized according to one or more aspects of the present disclosure to analyze dynamic well performance and the productivity or injectivity of different zones, diagnosing problem wells, or monitoring the results of a stimulation or completion. The in-situ measurements obtained during production/injection logging within the scope of the present disclosure may include one or more of temperature, flow rate, fluid density, fluid capacitance, holdup, phase-velocity, and/or others.

A well intervention involving activities in multiple lateral wellbores uses selective reentry into each of the target lateral wellbores. Selective reentry is achieved with a tool that enables recognition of the location of the junction between the lateral wellbore and the main wellbore and an ability to orient the bottom-hole assembly tool-face accordingly to allow entry into the lateral wellbore. An example of this lateral wellbore reentry tool or multi-lateral tool ("MLT") is the DISCOVERY MLT, commercially available from SCHLUMBERGER, which is a flow-activated, coiled tubing tool. Such lateral wellbore reentry tools may be utilized in conjunction with a number of other tools for various coiled tubing intervention operations in lateral wellbores. Example operations may include wellbore fill removal, formation damage removal through matrix stimulation, and various other types of other activities.

However, some types of intervention activities cannot be performed in a lateral wellbore. An example limitation is the inability to perform production logging in a lateral wellbore. Production logging is an operation that involves the measurement of pressure, temperature, and flow along a length of a producing interval of a wellbore, and includes the generation of a measurement log performed during the production phase of a well. From a production log, it is possible to determine from where the production is originating, as well as how much is being produced.

The inability to conduct production logging within lateral wellbores stems from lateral wellbores being inaccessible by existing production logging tools, thus precluding data logging after the lateral wellbores are drilled. Accordingly, diagnosis of production-related issues within the lateral wellbores of a multi-lateral well cannot easily be performed, if at all.

FIG. 1 is a schematic view of at least a portion of apparatus according to one or more aspects of the present disclosure. The apparatus, or at least a downhole tool thereof, is used to provide coiled tubing services or operations in a subterranean well. The apparatus includes or is utilized in conjunction with coiled tubing equipment provided at a wellsite via a truck 101. The truck 101 carries a tubing reel 103 upon which a quantity of coiled tubing 105 is spooled. One end of the coiled tubing 105 terminates proximate a center axis of the reel 103, such as at a reel plumbing apparatus 123 by which fluids may be pumped into the coiled tubing 105 while permitting the reel 103 to rotate. The other end of the coiled tubing 105 is coupled to a BHA 125 and placed and/or conveyed into a multi-lateral well (including a main wellbore 121 and a lateral wellbore 122) via an injector head 107 and gooseneck 109. The injector head 107 facilitates placing the BHA 125 and coiled tubing 105 into the multi-lateral well through various surface well control hardware, such as a blowout preventer stack 111 and a master control valve 113.

The BHA 125 includes a segmented lateral wellbore locator (e.g., a lateral wellbore reentry tool) including an attaching and deflection section 130 and a deflected section 135, wherein the deflected section 135 is depicted extending into the lateral wellbore 122. The BHA 125 also includes one or more tools 140 comprising one or more sensors 142. The deflected section 135 is shown as being extended at an acute angle α with respect to the longitudinal axis of the attaching and deflection section 130, and is sized in a length sufficient for incursion into the lateral wellbore 122.

The truck 101 may be some other mobile or permanently installed coiled tubing unit. The truck 101 also carries surface equipment 119, which includes a computer with a processor, memory, and/or other peripheral devices. The processor and/or other components of the surface equipment 119 may be implemented with one or more processors of various types suitable to the local application environment, and may include one or more general-purpose computers, special purpose computers, microprocessors, digital signal processors ("DSPs"), field-programmable gate arrays ("FPGAs"), application-specific integrated circuits ("ASICs"), and/or processors based on a multi-core processor architecture, as non-limiting examples. The memory may include one or more memories of various types suitable to the local application environment, and may be implemented using various suitable volatile or nonvolatile data storage technology, such as may comprise one or more semiconductor-based memory devices, magnetic memory devices, optical memory devices, fixed memories, and/or removable memories, among other examples. Programs stored in the memory may include program instructions or computer program code that, when executed by an associated processor, enable the surface equipment 119 to perform tasks as described herein. One or more modules and/or other portions of the surface equipment 119 may be implemented in accordance with hardware (embodied in one or more chips including an integrated circuit such as an application specific integrated circuit), or may be implemented as software or firmware for execution by a processor. In particular, in the case of firmware or software, the embodiment can be provided as a computer program product including a computer readable medium or storage structure embodying computer program code (i.e., software or firmware) thereon for execution by the processor.

The surface equipment 119 may be connected to the injector head 107, the reel 103, and/or other components, and may be operable to control or assist with injection of the BHA 125 and/or coiled tubing 105 into the multi-lateral well. The surface equipment 119 may also be operable to control or assist with location of the lateral wellbore 122, control of an operation of the tools/sensors 140, collection of measurement data, calibration of measurement data, and/or transmission between the BHA 125 and the wellsite surface 10. Such transmission may be via one or more communications links (not shown), such as may be or comprise one or more optical fibers. Monitoring equipment 118 may be provided together with or separate from the surface equipment 119. The connection between the coiled tubing 105 and the monitoring equipment 118 and/or the surface control equipment 119 may be a physical connection, as with communication lines, or it may be a virtual connection through a wireless transmission or known communications protocols, such as transmission control protocol/Internet protocol. Thus, for example, the monitoring equipment 118 may be located at some distance away from the multi-lateral well. The monitoring equipment 118 may also be utilized to transmit the received signals to offsite locations. The coiled tubing 105 may be in fluid communication with a supply of, for example, treatment fluid, which may be pumped from, for example, a location adjacent the truck 101, through the coiled tubing 105 and into the wellbore(s) 121 and/or 122.

Figure 2:
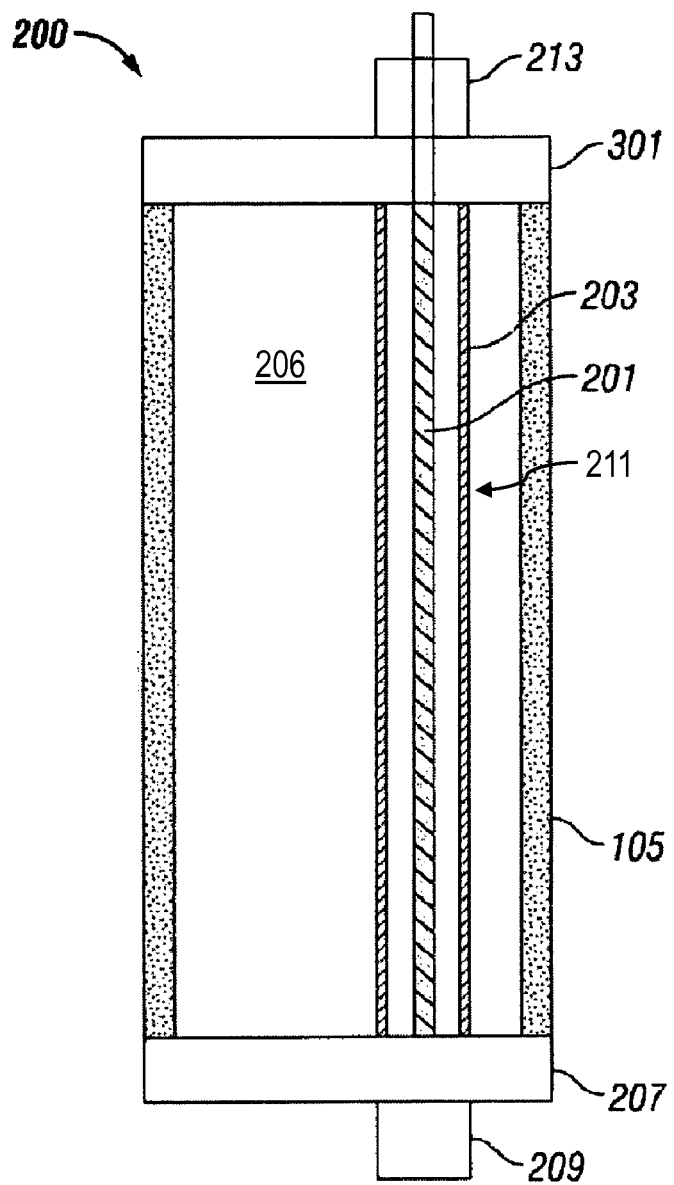
FIG. 2 is a cross-sectional view of at least a portion of apparatus according to one or more aspects of the present disclosure.

FIG. 2 is a cross-sectional view of a portion of an implementation of the apparatus shown in FIG. 1 according to one or more aspects of the present disclosure. Referring to FIGS. 1 and 2, collectively, a coiled tubing apparatus 200 may comprise coiled tubing 105 and a fiber optic tether 211. The fiber optic tether 211 may comprise an outer protective tube 203 and one or more optical fibers. The one or more optical fibers are hereafter collectively referred to as the optical fiber 201. The coiled tubing apparatus 200 also comprises a surface termination 301, a downhole termination 207, and a surface pressure bulkhead 213. The surface pressure bulkhead 213 is mounted in the reel 103, such as to seal the fiber optic tether 211 within the coiled tubing 105, which may aid in preventing release of treating fluid and/or pressure while providing access to the optical fiber 201. The coiled tubing defines an interior 206, through which treatment and/or other fluids may be pumped or flow from the surface 10 and into the wellbore(s) 121 and 122.

The downhole termination 207 may provide physical and/or optical connections between the optical fiber 201 and one or more optical tools/sensors 209. The optical tools/sensors 209 may be, comprise, be coupled to, or be a component of one or more of the tool(s) 140. The optical tools/sensors 209 may also provide functionality independent of one or more of the tool(s) 140. In either case, the tool(s) 140 (via the lateral wellbore locator illustrated in FIG. 1) may be operable for performing operations such as measurement, treatment, intervention, and/or other operations in which signals and/or data are transmitted between the surface equipment 119 and the tool(s) 140 downhole via the fiber optic tether 211. For example, such signals may convey measurements from the tool(s) 140 or convey control signals from the surface equipment 119 to the tool(s) 140. The signals may be conveyed in real time or otherwise. Examples operations may include matrix stimulation, fill cleanout, fracturing, scale removal, zonal isolation, coiled tubing conveyed perforation, downhole flow control, downhole completion manipulation, fishing, milling, coiled tubing drilling, production logging, and acquisition of calibration parameters, although other operations may also be within the scope of the present disclosure.

The optical tools/sensors 209 may comprise one or more temperature and/or pressure sensors, such as for determining bottom-hole temperature and/or pressure. The optical tools/sensors 209 may also comprise one or more sensors operable in obtaining formation pressure and/or temperature. The optical tools/sensors 209 may include a camera operable to provide a visual image of downhole condition (e.g., sand beds or scale collected on the wall of production tubing) or downhole equipment (e.g., equipment to be retrieved during a fishing operation). The optical tools/sensors 209 may also be or comprise a "feeler" operable to detect or infer physically detectable conditions in the multi-lateral well (e.g., sand beds, scale, lateral kick-offs, etc.). The optical tools/sensors 209 may include a chemical analyzer operable to perform chemical analysis, such as may be utilized in determining an amount of oil and/or gas in downhole fluid and/or measuring pH of the downhole fluid. The optical tools/sensors 209 may be connected to the fiber optic tether 211 for transmitting these and/or other examples of measurement data to the surface equipment 119 and/or other components at the wellsite surface 10. Thus, where the optical tools/sensors 209 operate to measure a property or condition in the multi-lateral well, the fiber optic tether 211 may provide the conduit to transmit or convey the measured property to surface.

The optical tools/sensors 209 may be or comprise one or more optically activated tools, such as activated valves or perforation firing-heads. With respect to perforation firing-heads, firing codes may be transmitted via the optical fiber 201 in the fiber optic tether 211. The codes may be transmitted on a single fiber and decoded downhole. The fiber optic tether 211 may contain multiple optical fibers with firing-heads connected to a separate fiber unique to that firing-head. Transmitting firing signals over the optical fiber 201 of the fiber optic tether 211 may avoid the deficiencies of cross-talk and pressure-pulse interference that may be encountered when using electrical line, wireline, or pressure-pulse telemetry to signal the firing heads.

The present disclosure introduces systems and methods for performing production logging in lateral wellbores of a multi-lateral well. Such systems/methods may deliver pressure, temperature, and/or flow rate measurements relative to depth within the lateral wellbores of a multi-lateral well. Such data is acquired utilizing tools/sensors of a downhole tool designed for coiled tubing conveyance, such as the tool(s) 140 shown in FIG. 1 and described above, instead of traditional wireline logging tools. The tools/sensors are packaged with flow-through compatibility, such that the BHA may be utilized with other coiled tubing tools. Such flow rate and/or production rate compatibility may allow the use of a lateral wellbore reentry tool as described above, including those that are operated by surface-controlled flow activation (i.e., through fluid flow through the coiled tubing interior 206 to the tool).

In the context of the present disclosure, a production log may be or comprise depth-correlated measurement of pressure, temperature, and/or flow rate within the lateral wellbore. Correlation to depth within the lateral wellbore may utilize a casing collar locator, which indicates depth relative to the tubulars in the wellbore, or a gamma ray tool, which indicates depth relative to the formation. A combination of these two methods may also be utilized. Thus, an example implementation of a BHA for performing production logging with coiled tubing according to one or more aspects of the present disclosure may comprise a lateral wellbore reentry tool, a depth sensing device (e.g., a casing collar locator and/or gamma ray tool), a depth control device (e.g., a deviation and inclination tool), and one or more pressure, temperature, and/or flow rate sensors. Such BHA may further comprise a power module (e.g., a battery module) for powering the one or more sensors, a telemetry sonde for transmitting data to the wellsite surface, and a fiber optic and/or other communications link to the wellsite surface (or at least a connection to such link).

Determining the flow rate may utilize distributed temperature sensing, perhaps in accordance with the communications link, such as the optical fiber 201. Such distributed temperature sensing is possible because of the Joule-Thompson effect associated with expanding gas (i.e., the cooling effect of the surrounding environment as gas from the formation is allowed to expand). This expansion takes place when gas from the formation flows into the well. The amount of cooling is substantially proportional to the amount of expanding gas. The greater amount of gas that is flowing and expanding, the more cooling is detected by distributed temperature sensing.

Figure 3:
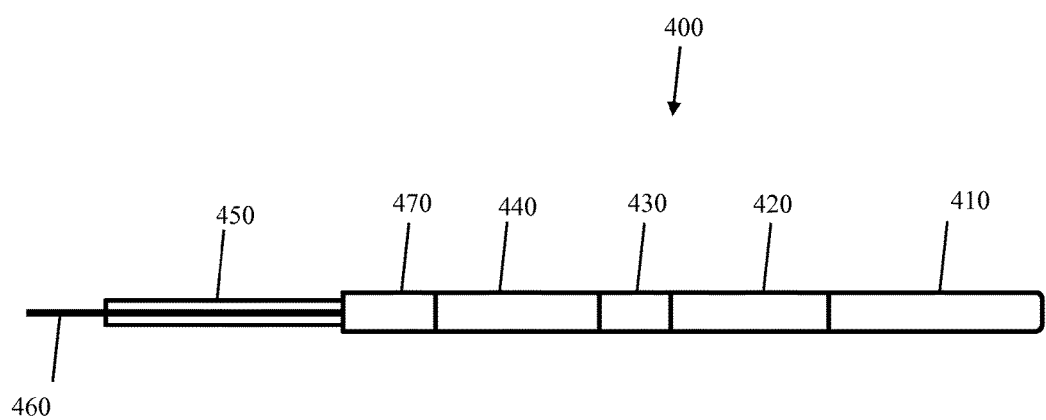
FIG. 3 is a cross-sectional view of at least a portion of apparatus according to one or more aspects of the present disclosure.

FIG. 3 is a schematic view of at least a portion of apparatus according to one or more aspects of the present disclosure. The apparatus is, comprises, or forms a portion of a BHA 400 for sensing gas production in a lateral wellbore or a multi-lateral wellbore. The BHA 400 depicted in FIG. 3 may be, comprise, or form a portion of the BHA 125 shown in FIG. 1.

The BHA 400 comprises a pressure and/or temperature sensor 440 coupled to a remote end of coiled tubing 450. The pressure and temperature sensor 440 is coupled to and powered by a power module 430, such as may comprise one or more batteries. The power module 430 is coupled to a depth control and/or sensing device 420, such as may be or comprise a casing collar locator tool, a gamma ray tool, and/or a deviation and inclination tool, which may also be powered by the power module 430. At the downhole end of the BHA 400 is a lateral wellbore reentry tool 410, such as the DISCOVERY MLT available from SCHLUMBERGER. However, other lateral wellbore reentry tools, whether described above or otherwise, are also within the scope of the present disclosure. A fiber optic tether 460 may extend through the coiled tubing 450 to provide a communications link, such as a data path for data to be transmitted to the wellsite surface. The fiber optic tether 460 may be coupled to a sonde 470 for transmitting data produced by the pressure and/or temperature sensor 440 and/or the depth control and/or sensing device 420 over the fiber optic tether 460 to the wellsite surface.

The use of distributed temperature sensing (performed at least in part by the pressure and temperature sensor 440) for measuring gas production may be calibrated with measurements produced by spinner-type flow meters. Despite the availability of advanced flow measurement sensors like the flow scan imager for characterizing flow in lateral wellbores, there are opportunities for analyzing the flow contribution of multiple production clusters in unconventional gas completions through the use of distributed temperature sensing. Using an optical fiber (such as embodied in the fiber optic tether 460) for gas flow measurements, whether temporarily or permanently installed in the lateral wellbore, creates an opportunity for addressing, offsetting, or displacing the comparatively high cost of using advanced flow measurement tools.

Production logging for a gas-producing, multi-lateral well may proceed as follows. The BHA 400 may be lowered into the main wellbore of the multi-lateral well. The lateral wellbore reentry tool 410 may then be operated to profile the location of the junction to the lateral wellbore, and to subsequently orient the BHA 400 accordingly to allow junction entry. The BHA 400 may then be conveyed into the lateral wellbore. The depth control and/or sensing device 420 may also be operated to aid in ensuring that the target lateral wellbore is entered, because several lateral junctions in the main wellbore may be spaced close together. The depth control and/or sensing device 420 may include a deviation and inclination tool to measure the deviation and inclination of the lateral wellbore junction, which may be compared to a deviation and inclination survey generated during the well drilling activity.

The BHA 400 may be run to target depth, after which the well may be allowed to produce gas at a stabilized rate. The measurements of pressure and temperature to obtain a pressure profile and temperature profile, which are referenced to depth within the lateral wellbore, are performed while the coiled tubing 450 is pulled (or retracted) from the downhole end of the lateral wellbore. Production logging measurements may be performed at various retraction speeds while pressure and temperature measurements are acquired.

To acquire the flow rate measurement, the BHA 400 may be run to the downhole end of the lateral wellbore, and the well may then be shut-in. Distributed temperature sensing data may then be acquired by connecting an appropriate measuring device or monitoring equipment to the surface end of the fiber optic tether 460, during which time the coiled tubing 450 and BHA 400 is held substantially stationary. Distributed temperature sensing may be performed with the fiber optic tether 460, such as by, for example, by transmitting pulses of light at a fixed wavelength from a light source in the surface equipment, such as the truck 101, down a fiber optic line, such as the fiber optic tether 460. At every measurement point in the line, light is back scattered and returns to the surface equipment. Knowing the speed of light and the moment of arrival of the return signal enables its point of origin along the fiber line to be determined. Temperature stimulates the energy levels of the silica molecules in the fiber line. The back-scattered light contains upshifted and downshifted wavebands (such as the Stokes Raman and Anti-Stokes Raman portions of the back-scattered spectrum), which can be analyzed to determine the temperature at origin. In this way the temperature of each of the responding measurement points in the fiber line can be calculated by the equipment, thereby providing a complete temperature profile along the length of the fiber line. The temperature along the lateral wellbore will initially increase due to geothermal gradient. The lateral wellbore is then allowed to produce at a rate similar to the original logging runs. The temperature profile along the lateral wellbore will then decrease due to the Joule-Thompson effect of the expanding gas. The distributed temperature sensing data is acquired until the temperature profile stabilizes. A flow rate profile of the lateral wellbore can then be generated with an appropriate thermal model for gas production, based on the acquired distributed temperature sensing data. An example of this product for analysis of distributed temperature sensing data is THERMA (commercially available from SCHLUMBERGER).

A calibration operation may also be performed utilizing a downhole production logging tool, such as the FLOW SCANNER tool available from SCHLUMBERGER, and/or another tool operable to measure localized gas/water holdup. The calibration operation may be utilized to benchmark the flow rate profile derived from the distributed temperature sensing data. The production logging tool utilized during such calibration may be a wireline logging tool (not shown) attached to the coiled tubing 450, perhaps attached to the fiber optic tether 460. The wireline logging tool may be in a memory mode, instead of transmitting data to the wellsite surface in real-time. The wireline logging tool may transmit data to the wellsite surface in real-time. During the calibration operation, the production logging BHA 400 may remain in the lateral wellbore, while the wireline logging tool (conveyed by wireline or coiled tubing) may obtain measurements from within the main wellbore. The flow rate measurements or profile derived from the distributed temperature sensing data may then be calibrated and/or compared against the calibration measurement data from spinner-type flow sensors and/or other sensors of the wireline logging tool. Furthermore, the availability of pressure, temperature, and flow measurements at the lateral wellbore junctions with the main wellbore may be utilized as tie-in points, including in scenarios in which gas production is co-mingled with water and/or hydrocarbon liquid.

Figure 4:
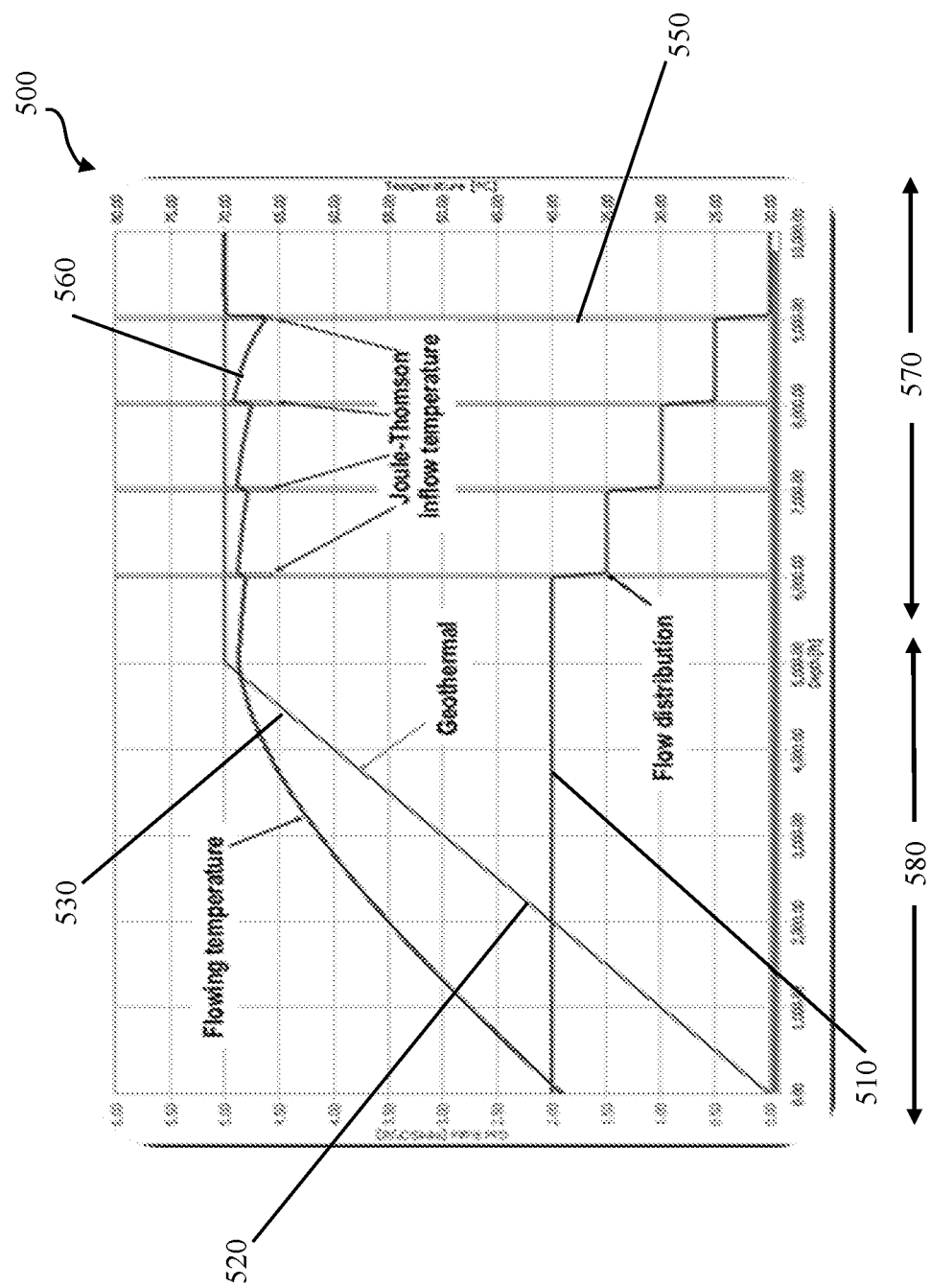
FIG. 4 is a graphical representation of physical characteristics of a lateral wellbore according to one or more aspects of the present disclosure.

FIG. 4 is a graphical representation of physical characteristics of a lateral wellbore according to one or more aspects of the present disclosure. In the illustrated embodiment, the graphical representation 500 demonstrates the physical characteristics of a lateral wellbore of a shale gas well. The horizontal axis of the graphical representation 500 represents depths of the lateral wellbore. The right vertical axis represents a temperature corresponding to a local geothermal temperature 520 and a well fluid flowing temperature 530. The left vertical axis represents gas flow rate corresponding to a flow distribution 510. As illustrated by the local geothermal temperature 520, the right portion 570 of the graphical representation 500 represents a horizontal region of the lateral wellbore where the local geothermal temperature 520 is substantially constant. The left portion 580 of the graphical representation 500 represents decreasing depth of the lateral wellbore as that portion of the lateral wellbore is closer to the wellsite surface.

Gas injection points into the lateral wellbore, such as through perforations at 1000-foot intervals, are represented by vertical lines, such as the vertical line 550. At the gas injection points, observing the graphical representation 500 from right to left, the well fluid flowing temperature 530 drops due to Joule-Thompson cooling of the expanding injected gas. The well fluid flowing temperature 530 then rises between gas injection points such as indicated by a segment 560. The corresponding flow distribution is represented by the flow distribution 510, which shows the cumulative flow injected at the four gas injection points. Correspondingly, the well fluid flowing temperature 530 also decreases.

Figure 5:
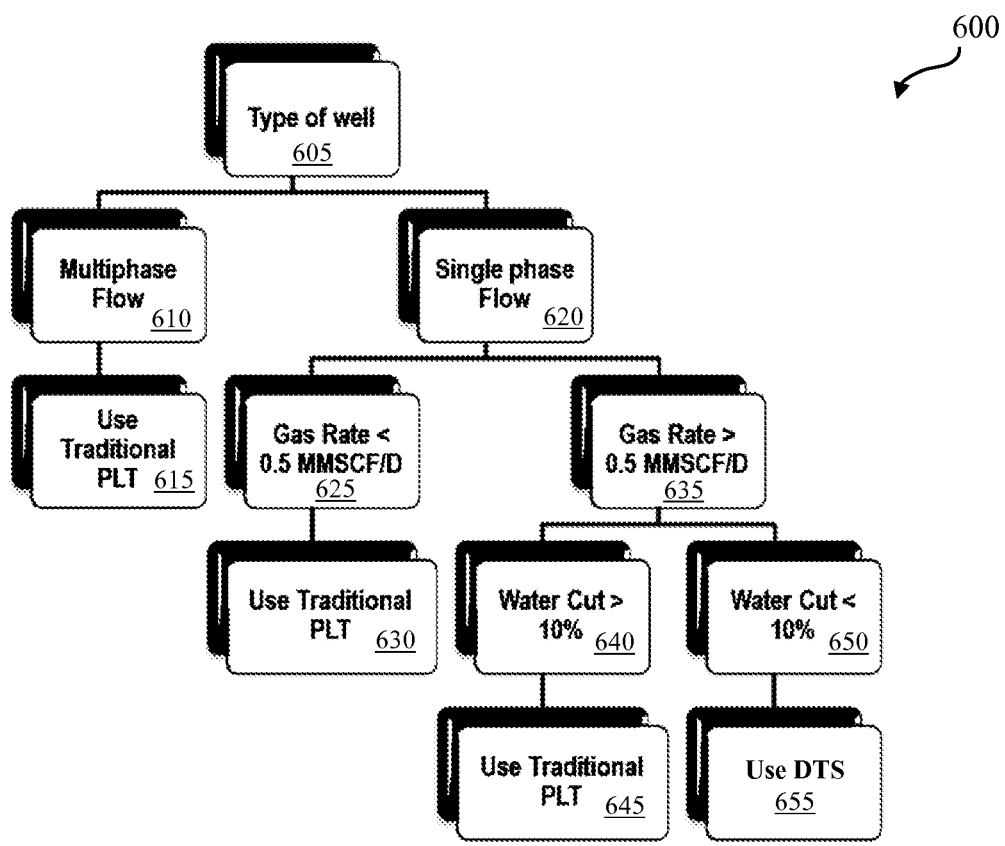
FIG. 5 is a flow-chart diagram of a decision tree to determine when to use distributed temperature sensing for measuring a flow rate of a gas in a lateral wellbore according to one or more aspects of the present disclosure.

FIG. 5 is a flow-chart diagram of a decision tree (600) to determine when to use distributed temperature sensing for measuring a flow rate of a gas in a lateral wellbore according to one or more aspects of the present disclosure. The decision tree (600) includes determining (605) the well type under consideration. If the type of well represents multi-phase flow (610), then a traditional production logging tool is used (615). If the well type represents single phase flow (620), and the flow rate is less than a predetermined rate such as, but not limited to, 0.5 million standard cubic feet per day ("MMSCF/D") (625), then a traditional production logging tool (630) is used. If the well type represents single phase flow (620), the flow rate is greater than a predetermined rate such as, but not limited to, 0.5 million standard cubic feet per day ("MMSCF/D") (635), and a water cut percentage is greater than a predetermined percentage such as, but not limited to, ten percent (640), then a traditional production logging tool is used (645). If the well type represents single phase flow (620), the flow rate is greater than a predetermined rate such as, but not limited to, 0.5 million standard cubic feet per day ("MMSCF/D") (635), and the water cut percentage is less than a predetermined percentage such as, but not limited to, ten percent (650), then distributed temperature sensing is used (655) for measuring the flow rate of the gas in the lateral wellbore.

Figure 6:
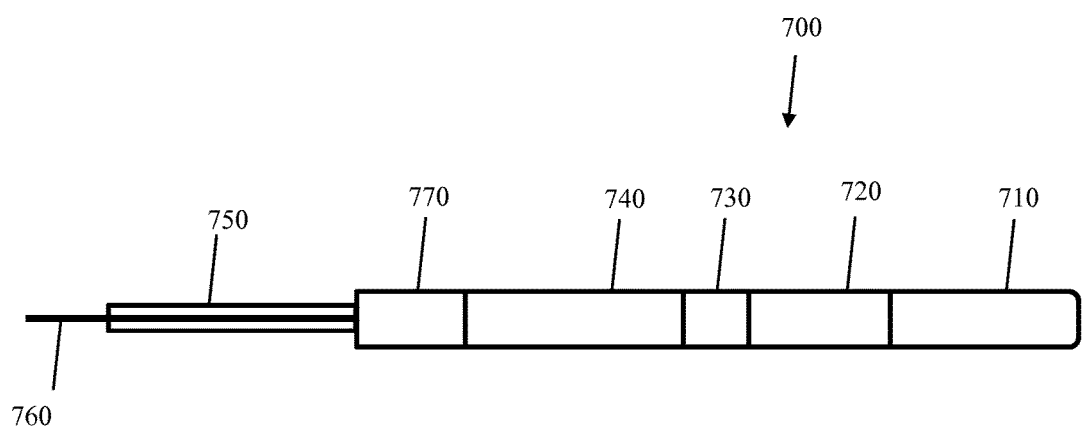
FIG. 6 is a cross-sectional view of at least a portion of apparatus according to one or more aspects of the present disclosure.

FIG. 6 is a schematic view of at least a portion of another implementation of the BHA 400 shown in FIG. 3, designated herein by reference numeral 700. The BHA 700 may be conveyed at the downhole end of coiled tubing 750, and is operable for production logging in a lateral wellbore of a liquid (e.g., oil) producing well, and may have one or more aspects in common with the BHA 400 shown in FIG. 3.

The BHA 700 comprises a directional flow sensor 740. The directional flow sensor 740 may comprise one or more spinners and/or other means for sensing the direction and/or rate of liquid flow around the BHA 700. The directional flow sensor 740 is coupled to and powered by a power module 730, such as may comprise one or more batteries, and which may have one or more aspects in common with the power module 430 shown in FIG. 3.

The power module 730 is also coupled to a depth control/sensing device 720, which may be or comprise a casing collar locator tool, a gamma ray tool, and/or a deviation and inclination tool, which may also be powered by the power module 730. The depth control/sensing device 720 may have one or more aspects in common with the depth control and/or sensing device 420 shown in FIG. 3.

The downhole end of the BHA 700 is or comprises a lateral wellbore reentry tool 710, such as the DISCOVERY MLT available from SCHLUMBERGER. However, other lateral wellbore reentry tools, whether described above or otherwise, are also within the scope of the present disclosure.

A fiber optic tether 760 extending through the coiled tubing 750 and/or other communications link provides a data path for measurement data to be transmitted to the wellsite surface. The fiber optic tether 760 may be coupled to a sonde 770 operable for transmitting measurement data produced by the directional flow sensor 740 and/or the depth control/sensing device 720, and/or other information, from the downhole tool to the wellsite surface. The pressure, temperature, and flow rate measurements and/or calculations to obtain pressure, temperature, and flow rate profiles according to one or more aspects of the present disclosure may be achieved in conjunction with utilization of the directional flow sensor 740.

Figure 7:
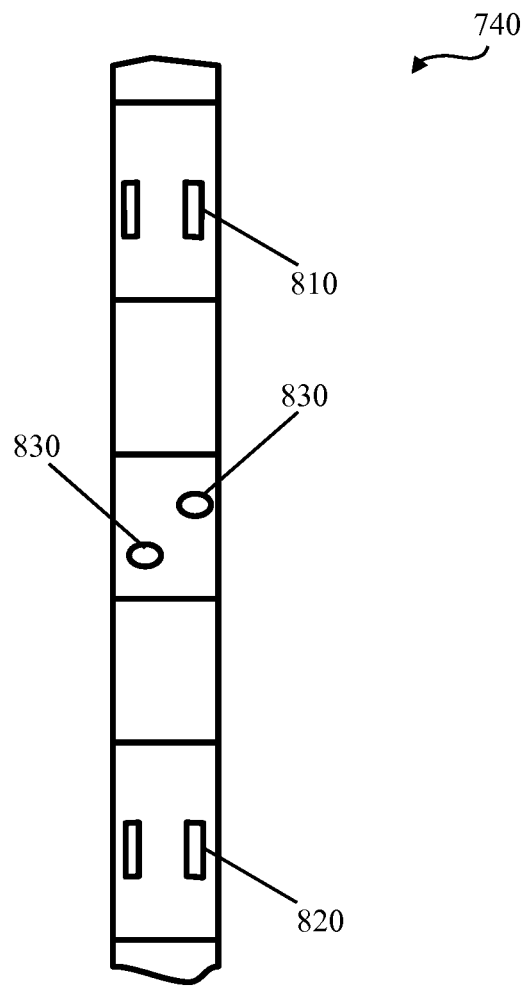
FIG. 7 is a cross-sectional view of at least a portion of apparatus according to one or more aspects of the present disclosure.

FIG. 7 is a schematic view of an example implementation of the directional flow sensor 740 shown in FIG. 6. The directional flow sensor 740 comprises one or more sensors, such as a first sensor 810 and second sensor 820, that may function as calorimetric flow meters. Calibration of the calorimetric flow meters with respect to the fluid flowing past the BHA 700 may be performed with the downhole tool in the wellbore, or calibration numbers may be generated offsite by testing a representative sample. The first and second sensors 810 and 820 may each comprise one or more temperature sensors and/or sensor arrays in contact with fluid flow proximate the directional flow sensor 740 and operable to sense a temperature change, such as relative to a reference temperature and/or a previously sensed temperature. As a result, provided that the heat capacity of the flowing liquid is known, it is possible to measure a flow rate of fluid flow past the sensors 810 and 820.

The directional flow sensor 740 may also comprise one or more thermal energy injectors 830 operable to inject thermal energy into the proximate fluid flow between the first and second sensors 810 and 820. For example, the fluid in which the BHA 700 is at least partially submersed (within the lateral wellbore) may substantially comprise liquid, in which case the thermal energy injected by the thermal energy injectors 830 may be in the form of water and/or another liquid carried by a component of the BHA 700 and having a temperature different from the surrounding fluid flow. Thus, the thermal energy injectors 830 may comprise nozzles, jets, ports, and/or other means for injecting the on-board liquid into the lateral wellbore. Similarly, the fluid in which the BHA 700 is at least partially submersed may substantially comprise gas, in which case the thermal energy injected by the thermal energy injectors 830 may be in the form of steam and/or another gas carried by a component of the BHA 700 and having a temperature different from the surrounding fluid flow. In either scenario, the thermal energy injectors 830 may instead or also comprise heaters (such as resistive heaters, chemical heaters, and the like), heat sinks, and/or other apparatus operable to heat or cool the surrounding fluid flow without injecting additional mass into the lateral wellbore. Thus, the first and second sensors 810 and 820 may each measure a temperature difference relative to or caused by the injected thermal energy. Such temperature difference(s) may be utilized by the directional flow sensor 740, another component of the BHA 700, and/or surface equipment to infer or otherwise determine or estimate a flow rate of the fluid flowing around the BHA 700 in the lateral wellbore.

For example, the first and second sensors 810 and 820 may measure or otherwise obtain temperatures $T_{up}$ and $T_{down}$, respectively. For fluid flow in a generally uphole direction, the first sensor(s) 810 may sense a fluid temperature that is warmer than a fluid temperature sensed by the second sensor(s) 820, such that $T_{up}$ is greater than $T_{down}$ due to the operation of the thermal energy injectors 830 and the direction of fluid flow. The second sensor 820 may be sensing a fluid temperature that substantially matches an ambient wellbore temperature. Similarly, for fluid flow in a generally downhole direction, the second sensor 820 may sense a fluid temperature that is warmer than a fluid temperature sensed by the first sensor(s) 810, such that $T_{down}$ is greater than $T_{up}$ due to the operation of the thermal energy injectors 830 and the direction of fluid flow. In such scenarios, the first sensor(s) 810 may be sensing a fluid temperature that substantially matches the ambient wellbore temperature. The specific heat of the surrounding fluid, the rate at which thermal energy is injected into the surrounding fluid, and the measured increase in temperature sensed by the sensor(s) 810 or 820 may be utilized to determine the direction and rate of fluid flow. Such determination may be performed via the directional fluid sensor 740, another component of the BHA 700, the associated surface equipment (such as the surface equipment 119 shown in FIG. 1), and/or a combination thereof.

Referring to FIGS. 6 and 7, collectively, the depth control/sensing device 720 may be utilized to reference the measurements obtained via the directional flow sensor 740 and/or other production logging measurements to depth within the lateral wellbore. The resulting production logging data may then be transmitted to surface, such as via the fiber optic tether 760 or otherwise.

An example implementation of the above-described production logging activity for an oil or liquid producing well may proceed as follows. Before or after a production logging run is performed in the lateral wellbore, a calibration operation may be carried out in the main wellbore, as described above. For example, a spinner-type flow meter and/or gas holdup tool and the directional flow sensor 740 may each be operated in the main wellbore, and the results of each may be compared to calibrate utilization of the directional flow sensor 740 in the lateral wellbore in which the spinner-type flow meter and/or gas holdup tool cannot be operated.

At the general vicinity of the junction between the main and lateral wellbores, the lateral wellbore reentry tool 710 may be utilized to profile the location of the junction. Thus, tool-face may be oriented accordingly, and the BHA 700 may be extended into the lateral wellbore. The depth control/sensing device 720 may be utilized in confirming that the target lateral wellbore has been successfully entered. However, in the absence of deviation and inclination data, such confirmation may be achieved utilizing depth reference features in the lateral wellbore that can be detected by a casing collar locator tool and/or gamma ray tool. Confirmation may also or instead be achieved by tagging the downhole end of the lateral wellbore, assuming the downhole end is accessible and the total measured depth of the lateral wellbore is known and not confusingly similar to the measured depth of other lateral wellbores of the multi-lateral well.

The BHA 700 is extended to a target depth within the lateral wellbore, and production logging commences with measurements acquired as the downhole tool is being pulled out of (or retracted from) the lateral wellbore. During this time, the lateral wellbore may be maintained at a stable or stabilized production flow rate. Multiple logging runs may be performed, perhaps at various retraction speeds, to more accurately quantify the flow rate measurements and profile. Unlike the distributed temperature sensing data, flow rate measurements utilizing the directional flow sensor 740 may be a direct output of the acquisition system, provided proper calibration has been accomplished.

Figure 8:
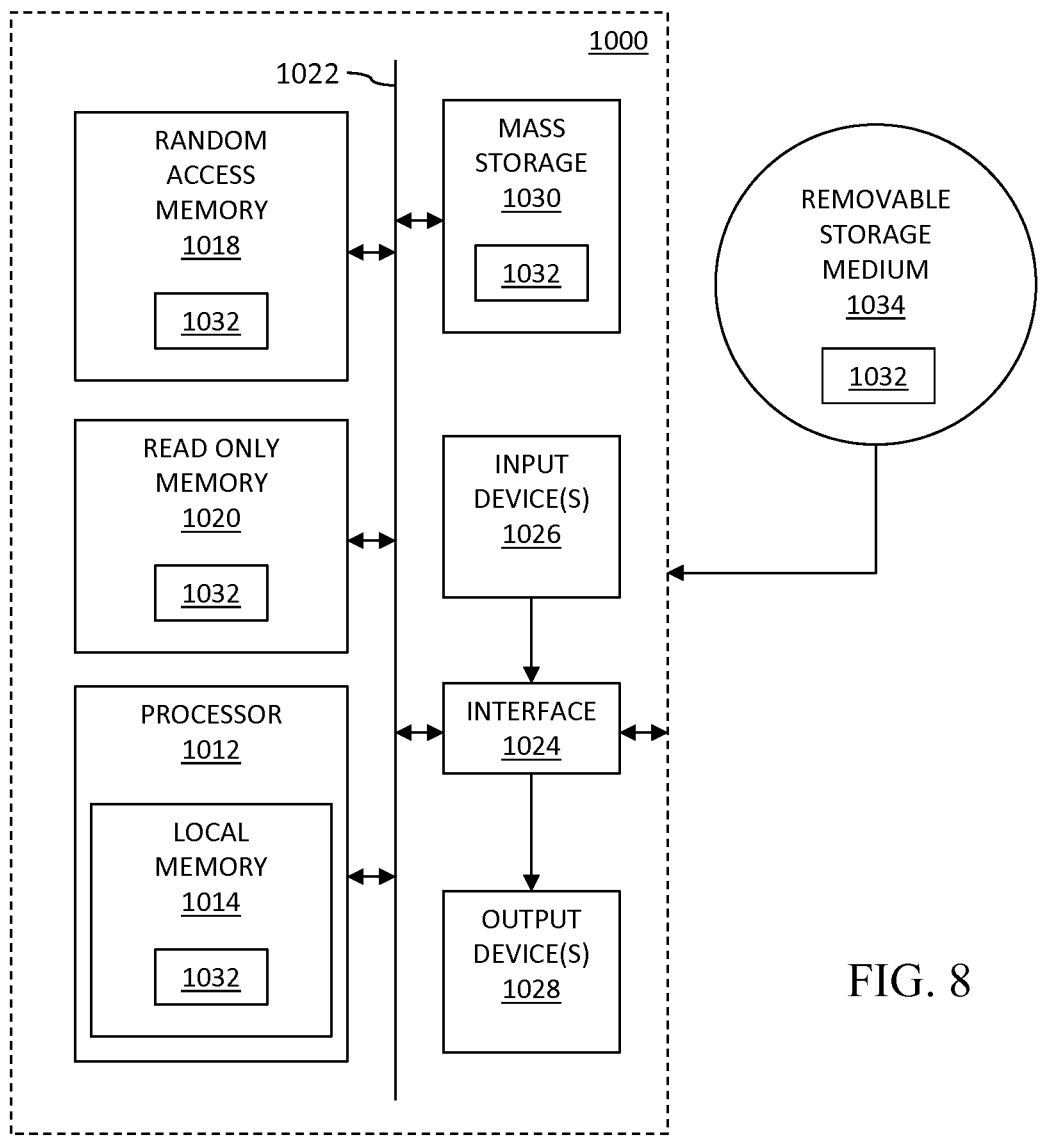
FIG. 8 is a block-diagram of at least a portion of apparatus according to one or more aspects of the present disclosure.

FIG. 8 is a block diagram of an example processing system 1000 that may execute example machine-readable instructions used to implement one or more of the methods and/or processes described herein, and/or to implement a portion of one or more of the example downhole and/or surface apparatus described herein. The processing system 1000 may be or comprise, for example, one or more processors, controllers, special-purpose computing devices, servers, personal computers, personal digital assistant (PDA) devices, smartphones, internet appliances, and/or other types of computing devices. Moreover, while it is possible that the entirety of the processing system 1000 shown in FIG. 8 is implemented within a downhole tool, such as the downhole tools and/or modules shown in one or more of FIGS. 1-7, it is also contemplated that one or more components or functions of the system 1000 may be implemented in wellsite surface equipment, perhaps including at least a portion of the surface equipment 119 depicted in FIG. 1.

The system 1000 comprises a processor 1012 such as, for example, a general-purpose programmable processor. The processor 1012 includes a local memory 1014, and executes coded instructions 1032 present in the local memory 1014 and/or in another memory device. The processor 1012 may execute, among other things, machine-readable instructions to implement the methods and/or processes described herein. The processor 1012 may be, comprise, or be implemented by various types of processing units, such as one or more INTEL microprocessors, microcontrollers from the ARM and/or PICO families of microcontrollers, embedded soft/hard processors in one or more FPGAs, etc. Of course, other processors from other families are also appropriate.

The processor 1012 is in communication with a main memory including a volatile (e.g., random-access) memory 1018 and a non-volatile (e.g., read-only) memory 1020 via a bus 1022. The volatile memory 1018 may be, comprise, or be implemented by static random access memory (SRAM), synchronous dynamic random access memory (SDRAM), dynamic random access memory (DRAM), RAMBUS dynamic random access memory (RDRAM) and/or other types of random access memory devices. The non-volatile memory 1020 may be, comprise, or be implemented by flash memory and/or other types of memory devices. One or more memory controllers (not shown) may control access to the memory 1018 and/or 1020.

The processing system 1000 also includes an interface circuit 1024. The interface circuit 1024 may be, comprise, or be implemented by various types of standard interfaces, such as an Ethernet interface, a universal serial bus (USB), a third generation input/output (3GIO) interface, a wireless interface, and/or a cellular interface, among others. The interface circuit 1024 may also comprise a graphics driver card. The interface circuit 1024 may also include a communication device such as a modem or network interface card to facilitate exchange of data with external computers via a network (e.g., Ethernet connection, digital subscriber line (DSL), telephone line, coaxial cable, cellular telephone system, satellite, etc.).

One or more input devices 1026 are connected to the interface circuit 1024. The input device(s) 1026 permit a user to enter data and commands into the processor 1012. The input device(s) may be, comprise, or be implemented by, for example, a keyboard, a mouse, a touchscreen, a track-pad, a trackball, an isopoint, and/or a voice recognition system, among others.

One or more output devices 1028 are also connected to the interface circuit 1024. The output devices 1028 may be, comprise, or be implemented by, for example, display devices (e.g., a liquid crystal display or cathode ray tube display (CRT), among others), printers, and/or speakers, among others.

The processing system 1000 may also include one or more mass storage devices 1030 for storing machine-readable instructions and data. Examples of such mass storage devices 1030 include floppy disk drives, hard drive disks, compact disk drives, and digital versatile disk (DVD) drives, among others. The coded instructions 1032 may be stored in the mass storage device 1030, the volatile memory 1018, the non-volatile memory 1020, the local memory 1014, and/or on a removable storage medium, such as a CD or DVD 1034.

As an alternative to implementing the methods and/or apparatus described herein in a system such as the processing system 1000 of FIG. 8, methods and or apparatus within the scope of the present disclosure may be embedded in another structure, such as a processor and/or an application-specific integrated circuit (ASIC).

Figure 9:
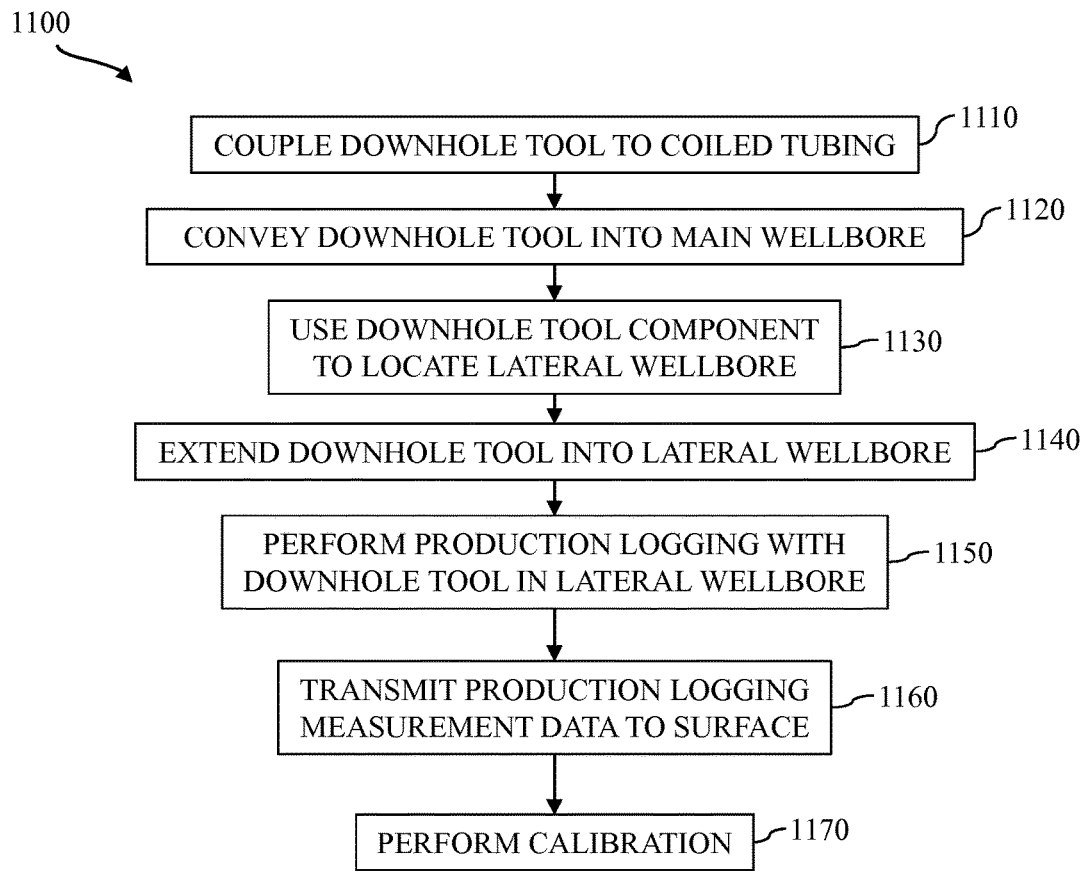
FIG. 9 is a flow-chart diagram of at least a portion of a method according to one or more aspects of the present disclosure.

FIG. 9 is a flow-chart diagram of at least a portion of a method (1100) according to one or more aspects of the present disclosure. At least a portion of the method (1100) may be executed by apparatus having one or more aspects in common with the apparatus shown in one or more of FIGS. 1-8 and/or other apparatus within the scope of the present disclosure. Thus, for example, one or more components of downhole apparatus, surface equipment, or a combination thereof may execute at least a portion of the method (1100) within the scope of the present disclosure.

The method (1100) includes coupling (1110) a downhole tool to a downhole termination of coiled tubing. The downhole tool is then conveyed (1120) into a main wellbore of a multi-lateral well via the coiled tubing. A component of the downhole tool, such as a lateral wellbore reentry tool as described above, is then used (1130) to locate a lateral wellbore extending from the main wellbore. For example, the lateral wellbore reentry tool may be orientated by surface-controlled flow activation to position a portion of the downhole tool for entry into the lateral wellbore. The downhole tool is then extended (1140) into the lateral wellbore via the coiled tubing.

Production logging is then performed (1150) with the downhole tool in the lateral wellbore. The production logging (1150) may comprise measuring or otherwise obtaining pressure, temperature, and/or flow rate of fluid in which the downhole tool is at least partially submersed within the lateral wellbore, wherein such pressure, temperature, and/or flow rate are logged relative to depth within the lateral wellbore. The production logging (1150) may be performed while advancing and/or retracting the downhole tool within the lateral wellbore via the coiled tubing.

In scenarios in which the downhole tool is at least partially submersed in a fluid having a large liquid (e.g., hydrocarbon) component, the production logging (1150) may include measuring a flow rate by injecting thermal energy into the liquid and measuring a resulting temperature change, as described above. After liquid is produced in the lateral wellbore at a stabilized rate, the production logging (1150) may include measuring a pressure profile, a temperature profile, and/or a flow rate profile referenced to depth within the lateral wellbore while the downhole tool is retracted from the lateral wellbore via the coiled tubing.

In scenarios in which the downhole tool is at least partially submersed in a fluid having a large gas component, and after the gas is produced in the lateral wellbore at a stabilized rate, the production logging (1150) may include measuring pressure and/or temperature of the gas referenced to depth within the lateral wellbore to obtain a pressure and/or temperature profile while retracting the downhole tool from the lateral wellbore via the coiled tubing. Such production logging (1150) may further include generating a flow rate profile of the gas in the lateral wellbore by employing a thermal model for gas production based on the obtained pressure and/or temperature profile. Generating the flow profile of the gas may employ distributed temperature sensing data acquired while the lateral wellbore is shut in, as described above.

The measurement data resulting from the production logging (1150) may be transmitted (1160) to surface via a communications link. The communications link may be carried in the coiled tubing, and may include an optical fiber. The measurement data may also be calibrated (1170) utilizing calibration measurement data derived from a calibration operation also performed in the multi-lateral well, as described above.

In view of all of the above, including the figures, a person having ordinary skill in the art should readily recognize that the present disclosure introduces a method comprising: coupling a downhole tool to a downhole termination of coiled tubing; conveying the downhole tool into a main wellbore of a multi-lateral well via the coiled tubing; using a component of the downhole tool to locate a lateral wellbore extending from the main wellbore; extending the downhole tool into the lateral wellbore via the coiled tubing; and performing production logging with the downhole tool in the lateral wellbore. Performing production logging may comprise measuring a pressure, temperature, and/or flow rate of a fluid in which the downhole tool is at least partially submersed within the lateral wellbore. Measuring a flow rate of the fluid may comprise injecting thermal energy into the fluid and measuring a resulting temperature change of the fluid. Production logging may comprise relating each of a plurality of pressure measurements, each of a plurality of temperature measurements, and each of a plurality of flow rates to depth of the downhole tool within the lateral wellbore.

The method may further comprise transmitting production logging data over a communications link to a wellsite surface associated with the multi-lateral well.

The method may further comprise calibrating measurement data from the production logging with calibration measurement data derived from a calibration operation in the multi-lateral well.

The method may further comprise producing a gas in the lateral wellbore at a stabilized rate, and performing production logging may comprise: measuring pressure and temperature of the gas with respect to depth in the lateral wellbore while retracting the downhole tool from the lateral wellbore; and generating a flow profile of the gas in the lateral wellbore based on the measured pressure and temperature and a thermal model for gas production. Generating the flow profile of the gas may employ distributed temperature sensing data. The distributed temperature sensing data may be acquired while the lateral wellbore is shut in.

The method may further comprise producing a liquid in the lateral wellbore at a stabilized rate, and performing production logging may comprise measuring pressure, temperature, and flow rate of the liquid with respect to depth in the lateral wellbore while retracting the downhole tool from the lateral wellbore.

The present disclosure also introduces an apparatus comprising: a downhole tool coupled to a downhole termination of coiled tubing for conveyance within a main wellbore that extends from a wellsite surface to a subterranean formation, wherein the downhole tool comprises: a lateral wellbore reentry tool operable to locate a lateral wellbore extending from the main wellbore, wherein the downhole tool is operable for conveyance into the lateral wellbore via the coiled tubing; a depth device operable to determine depth of the downhole tool in the main and lateral wellbores; a sensor operable for production logging of a measurement sensed with respect to depth within the lateral wellbore; and a sonde operable to transmit production logging data over a communications link extending between the downhole tool and a wellsite surface associated with the main wellbore, wherein the production logging data is obtained via operation of the sensor.

The lateral wellbore reentry tool may be operable via surface-controlled flow activation.

The communications link may comprise an optical fiber of the coiled tubing.

The production logging data may comprise at least one of pressure, temperature, and flow rate of a fluid in which the downhole tool is at least partially submersed within the lateral wellbore.

The production logging data may comprise a flow rate measured in conjunction with operation of the sensor and thermal energy injected into a fluid in which the downhole tool is at least partially submersed relative to the lateral wellbore.

The production logging data may comprise: a pressure and temperature profile referenced to depth within the lateral wellbore and comprising pressure and temperature of a fluid in which the downhole tool is at least partially submersed within the lateral wellbore; and a flow rate profile of the fluid referenced to depth within the lateral. The fluid may substantially comprise gas. The flow rate profile may be generated by the downhole tool in conjunction with a thermal model for gas production that is based on the pressure and temperature profile. The fluid may also substantially comprise liquid.

The present disclosure also introduces a method comprising: conveying a downhole tool within a main wellbore of a multi-lateral well via coiled tubing, wherein the downhole tool is in communication with surface equipment disposed at a wellsite surface associated with the multi-lateral well; operating the downhole tool to locate a lateral wellbore extending from the main wellbore; conveying the downhole tool into the lateral wellbore via the coiled tubing; and operating at least one of the downhole tool and the surface equipment to obtain production logging data while conveying the downhole tool out of the lateral wellbore via the coiled tubing.

The production logging data may comprise pressure or temperature of a fluid in which the downhole tool is at least partially submersed within the lateral wellbore. The production logging data may comprise pressure and temperature of a fluid in which the downhole tool is at least partially submersed within the lateral wellbore. The production logging data may comprise a flow rate of a fluid in which the downhole tool is at least partially submersed within the lateral wellbore. The method may further comprise operating at least one of the downhole tool and the surface equipment to: inject thermal energy into the fluid; and determine the flow rate based on a measured temperature change resulting from injection of the thermal energy.

The method may further comprise operating the downhole tool to transmit the production logging data to the wellsite surface.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. A method, comprising:
   coupling a downhole tool to a downhole termination of coiled tubing;
   conveying the downhole tool into a main wellbore of a multi-lateral well via the coiled tubing;
   using a component of the downhole tool to locate a lateral wellbore extending from the main wellbore;
   extending the downhole tool into the lateral wellbore via the coiled tubing;

performing production logging with the downhole tool in the lateral wellbore; and calibrating measurement data from the production logging with calibration measurement data derived from a calibration operation performed in the multi-lateral well.

2. The method of claim 1 wherein performing production logging comprises measuring a pressure and temperature of a fluid in which the downhole tool is at least partially submersed within the lateral wellbore.

3. The method of claim 1 wherein performing production logging comprises measuring a flow rate of a fluid in which the downhole tool is at least partially submersed within the lateral wellbore.

4. The method of claim 1 wherein performing production logging comprises measuring a flow rate of a fluid, in which the downhole tool is at least partially submersed within the lateral wellbore, by injecting thermal energy into the fluid and measuring a resulting temperature change of the fluid.

5. The method of claim 1 wherein performing the production logging comprises relating each of a plurality of pressure measurements, each of a plurality of temperature measurements, and each of a plurality of flow rates to depth of the downhole tool within the lateral wellbore.

6. The method of claim 1 further comprising producing a gas in the lateral wellbore at a stabilized rate, and wherein performing production logging comprises:
measuring pressure and temperature of the gas with respect to depth in the lateral wellbore while retracting the downhole tool from the lateral wellbore; and
generating a flow profile of the gas in the lateral wellbore based on the measured pressure and temperature and a thermal model for gas production.

7. The method of claim 1 wherein performing production logging employs distributed temperature sensing data.

8. The method of claim 7 wherein the distributed temperature sensing data is obtained utilizing an optical fiber of a communications link extending within the coiled tubing to a wellsite surface associated with the multi-lateral well.

9. The method of claim 1 further comprising producing a liquid in the lateral wellbore at a stabilized rate, and wherein performing production logging comprises measuring pressure, temperature, and flow rate of the liquid with respect to depth in the lateral wellbore while retracting the downhole tool from the lateral wellbore.

10. An apparatus, comprising:
a downhole tool coupled to a downhole termination of coiled tubing for conveyance within a main wellbore that extends from a wellsite surface to a subterranean formation, wherein the downhole tool comprises:
a lateral wellbore reentry tool operable to locate a lateral wellbore extending from the main wellbore, wherein the downhole tool is operable for conveyance into the lateral wellbore via the coiled tubing;
a depth device operable to determine depth of the downhole tool in the main and lateral wellbores;
a sensor operable for production logging of a measurement sensed with respect to depth within the lateral wellbore; and
a sonde operable to transmit production logging data over a communications link extending between the downhole tool and a wellsite surface associated with the main wellbore, wherein the production logging data is obtained via operation of the sensor, wherein the production logging data comprises a flow rate measured in conjunction with operation of the sensor and thermal energy injected into a fluid in which the downhole tool is at least partially submersed relative to the lateral wellbore.

11. The apparatus of claim 10 wherein the lateral wellbore reentry tool is operable via surface-controlled flow activation.

12. The apparatus of claim 10 wherein the production logging data is correlated to depth within the lateral wellbore and comprises at least one of pressure, temperature, and flow rate of a fluid in which the downhole tool is at least partially submersed within the lateral wellbore.

13. The apparatus of claim 10 wherein the production logging data comprises:
a pressure and temperature profile referenced to depth within the lateral wellbore and comprising pressure and temperature of a fluid in which the downhole tool is at least partially submersed within the lateral wellbore; and
a flow rate profile of the fluid referenced to depth within the lateral.

14. The apparatus of claim 13 wherein the fluid substantially comprises gas, and wherein the flow rate profile is generated by the downhole tool in conjunction with a thermal model for gas production that is based on the pressure and temperature profile.

15. A method, comprising:
conveying a downhole tool within a main wellbore of a multi-lateral well via coiled tubing, wherein the downhole tool is in communication with surface equipment disposed at a wellsite surface associated with the multi-lateral well;
operating the downhole tool to locate a lateral wellbore extending from the main wellbore;
conveying the downhole tool into the lateral wellbore via the coiled tubing;
operating at least one of the downhole tool and the surface equipment to obtain production logging data while conveying the downhole tool out of the lateral wellbore via the coiled tubing, wherein the production logging data comprises a flow rate of the fluid; and
operating at least one of the downhole tool and the surface equipment to:
inject thermal energy into the fluid; and
determine the flow rate based on a measured temperature change resulting from injection of the thermal energy.

16. The method of claim 15 wherein the production logging data comprises pressure and temperature of a fluid in which the downhole tool is at least partially submersed within the lateral wellbore.

17. A method, comprising:
coupling a downhole tool to a downhole termination of coiled tubing;
conveying the downhole tool into a main wellbore of a multi-lateral well via the coiled tubing;
using a component of the downhole tool to locate a lateral wellbore extending from the main wellbore;
extending the downhole tool into the lateral wellbore via the coiled tubing; and
performing production logging with the downhole tool in the lateral wellbore by measuring a flow rate of a fluid in which the downhole tool is at least partially submersed within the lateral wellbore by injecting thermal energy into the fluid and measuring a resulting temperature change of the fluid.

* * * * *